United States Patent Office
3,772,209
Patented Nov. 13, 1973

3,772,209
LIQUID CRYSTAL COMPOSITIONS
Donald C. Batesky, Rochester, N.Y., assignor to Eastman Kodak Company, Rochester, N.Y.
No Drawing. Filed Jan. 21, 1972, Ser. No. 219,901
Int. Cl. G01n 33/00
U.S. Cl. 252—408    17 Claims

ABSTRACT OF THE DISCLOSURE

A nematic liquid crystal composition having a very broad mesophase comprising a mixture of at least two compounds of the formula:

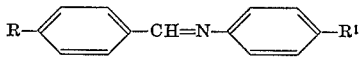

wherein each R and $R^1$ are radicals selected from the group consisting of a saturated alkoxy radical and an alkyl radical each having from 1 to 9 carbon atoms and only one of each R and $R^1$ is alkyl, and at least one compound of the formula:

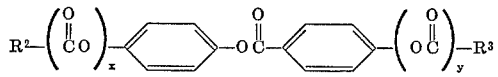

wherein $R^2$ and $R^3$ are saturated alkoxy radicals of from 1 to 9 carbon atoms, one of $x$ and $y$ is 0 and the other is 1.

FIELD OF THE INVENTION

This application relates generally to liquid crystal compositions and more particularly to nematic liquid crystal compositions having a broad mesophase.

BACKGROUND OF THE INVENTION

Nematic liquid crystal compositions are used in various electro-optical devices which involve the modulation of light, such as light valves and optical display devices. Such light valves are controlled by an electric field and operate when the liquid crystal material is in its mesomorphic state. Generally, when no electric field is applied to the nematic liquid crystal material, the device containing a thin layer of this material is relatively transparent to light. When an electric field is applied to the liquid crystal material above a threshold value, which value depends upon the particular liquid crystal composition, the device appears to become opaque in the region of the field. This opacity is due to the scattering of light by domains of the liquid crystal molecules which align themselves in the field.

The electro-optical effect due to alignment of domains of the nematic liquid crystal molecules in an electric field may be employed in transmissive, reflective, or absorptive-type flat-panel displays, in light shutters, and in other applications.

Compositions having a mesomorphic state or mesophase have wide melting or transition points. The first transition point is at the transition from the crystalline solid state to the mesomorphic state. The second transition point is at the transition from the mesomorphic state to the isotropic liquid. Between these temperatures the compound exists in the mesomorphic or liquid crystalline state in which it behaves both as a liquid in that it flows and exists in drops that coalesce, and as a solid in that it is optically or electrically anisotropic and has a structural order in one or two dimensions.

Nematic liquid crystals are electrically and magnetically anisotropic. On surfaces such as glass, the nematic phase generally adopts a characteristic threaded texture visible between crossed polaroids. This texture is thought to consist of many domains or clusters in which the liquid crystal molecules have a fixed orientation. According to the cluster theory of nematic liquid crystals, the clusters are normally randomly oriented, accounting for the light-scattering properties and for the turbid appearance of a fairly large volume. Each cluster is birefringent and is about $10^{-5}$ cm. in size. Upon applying an electric or magnetic field to a layer of mesomorphic crystals, the clusters tend to become oriented in a particular direction, thereby changing the light-scattering and birefringent properties of the layer. The degree of orientation is dependent upon the magnitude of the applied field. Hence, the light-scattering properties and birefringent properties of a volume of nematic liquid crystalline material can be modulated with an electric or magnetic field.

Where the use of a liquid crystal composition is dependent on changes in orientation of the composition while in the mesomorphic state, the composition must be above the crystal-mesomorphic transition temperature. Prior art liquid crystal compositions have relatively high crystal-mesomorphic transition temperatures. Therefore, heat must be provided to keep the composition in the mesomorphic state. The higher this transition temperature, the greater the cost of heating. Another disadvantage of the prior-art compositions is that the temperature range in which the composition remains in the liquid crystalline state is relatively small. This may require means to control the heating.

SUMMARY OF THE INVENTION

It is therefore an object of the present invention to provide an improved liquid crystal mixture. A further object of this invention is to provide a nematic liquid crystal mixture having a wide mesophase. Another object of this invention is to provide a liquid crystal composition having a mesomorphic state at room temperature. A further object of this invention is to provide a nematic liquid crystal composition having a crystal-mesomorphic transition temperature below room temperature. Another object of this invention is to provide a liquid crystal composition that does not require careful temperature control.

These and other objects and advantages are accomplished by a mixture of at least two compounds of the Formula I:

(I) 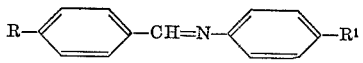

with at least one compound of the Formula II:

(II) 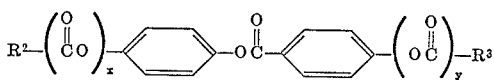

wherein R, $R^1$, $R^2$ and $R^3$ and $x$ and $y$ are as hereinafter defined.

DETAILED DESCRIPTION OF A PREFERRED EMBODIMENT

The family of nematic liquid crystal compositions provided by this invention include at least two compounds of the following Formula I:

(I) 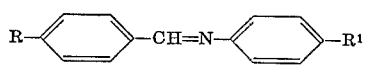

wherein each R and $R^1$ are radicals selected from the group consisting of a saturated alkoxy radical of from 1 to 9 carbon atoms and an alkyl radical of from 1 to 9 carbon atoms. When R is a saturated alkoxy radical, $R^1$ is an alkyl radical and vice versa. Exemplary of compounds of this structure are N-(p-methoxybenzylidene)-p-ethylaniline; N-(p-methoxybenzylidene)-p-butylaniline; N-(p-butoxybenzylidene)-p-propylaniline; N-(p-methoxybenzylidene)-p-propylaniline; and N-(p-ethoxybenzylidene)-p-butylaniline. Other compounds of the structure of Formula I and which may be used in this mixture are shown in Table I.

TABLE I

| Compound: | R | R¹ |
|---|---|---|
| 1 | $C_2H_5O$ | $(CH_2)_3CH_3$ |
| 2 | $CH_3(CH_2)_3O$ | $(CH_2)_3CH_3$ |
| 3 | $CH_3(CH_2)_3O$ | $C_2H_5$ |
| 4 | $CH_3(CH_2)_4O$ | $C_2H_5$ |
| 5 | $C_2H_5O$ | $C_8H_{17}$ |
| 6 | $C_2H_5O$ | $(CH_2)_4CH_3$ |
| 7 | $CH_3(CH_2)_6O$ | $C_2H_5$ |
| 8 | $C_2H_5$ | $OCH_3$ |
| 9 | $C_2H_5$ | $O(CH_2)_3CH_3$ |
| 10 | $(CH_2)_3CH_3$ | $O(CH_2)_3CH_3$ |
| 11 | $C_8H_{17}$ | $OC_2H_5$ |
| 12 | $C_2H_5$ | $OC_8H_{17}$ |

The foregoing compounds are only exemplary of the compounds which may be incorporated into the nematic liquid crystal composition of this invention. Compounds of this type are disclosed in and prepared by the methods disclosed in German patent application No. 2,017,727 published Oct. 29, 1970, incorporated herein by reference. Compounds having the structure of Formula I are preferably present in amounts of about 60 to about 75 weight percent of the total mixture. In a still further preferred embodiment, the two compounds of this structure are present in about equal amounts of, for example, about 50 weight percent each.

The liquid crystal compositions of this invention include a compound of the following Formula II:

(II) 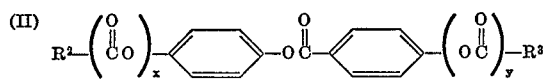

wherein $R^2$ and $R^3$ are saturated alkoxy radicals having from 1 to 9 carbon atoms, $x$ and $y$ differ and are selected from the group consisting of 0 and 1. Typical examples of useful alkoxy radicals are set out above (in the description of substituents in Formula I), and preferably have 1 to 5 carbon atoms.

Exemplary of compounds of Formula II is butyl p(p-ethoxyphenoxycarbonyl)phenyl carbonate. In a particularly preferred embodiment of this invention, a compound of this structure is present in about 25 weight percent to about 35 weight percent.

In order for the nematic liquid crystal compositions of this invention to produce best results, the compounds forming the composition are preferably first purified so as to remove particulate impurities, as well as impurities within the crystalline phase. One measure of purity is the resistivity of the compounds. The pure compounds disclosed herein generally have resistivities in the range of $10^9$–$10^{10}$ ohm-centimeters.

The mixtures are prepared by careful recrystallization of each compound until a constant and reversible mesomorphic range is attained. The color of each compound is reduced to a minimum to achieve a mixture with minimum color. The compounds are then weighed, mixed, and melted together and stirred to obtain a homogeneous nematic melt. The resulting mixture is filtered to remove trace insoluble materials, then stirred over a molecular sieve to remove traces of moisture.

The following examples will illustrate the preparation of the compounds comprising the nematic liquid crystal mixtures of this invention.

Example 1

Butyl p-(ethoxyphenoxycarbonyl)phenyl carbonate is prepared by the esterification of p-hydroxybenzoic acid with p-ethoxyphenol to form p-ethoxyphenyl p-hydroxybenzoate. This intermediate is treated with butyl chloroformate in the presence of pyridine or triethylamine to yield the desired product.

Example 2

N-(p-butoxybenzylidene)-p-propylaniline is prepared by treating p-propylaniline with p-butoxybenzaldehyde in alcohol. The product is recrystallized from alcohol.

Example 3

N-(p-ethoxybenzylidene)-p-butylaniline is prepared by treating p-butylaniline with p-ethoxybenzaldehyde in alcohol. The pure product is obtained by recrystallization from alcohol.

Example 4

N-(p-methoxybenzylidene)-p-propylaniline is prepared by treating p-propylaniline with anisaldehyde in alcohol. The product is recrystallized from alcohol.

Example 5

N-(p-methoxybenzylidene)-p-butylaniline is prepared by treating p-butylaniline with anisaldehyde in alcohol. The product is recrystallized from isopropyl alcohol.

Example 6

N-(p-propoxybenzylidene)-p-butylaniline is prepared by treating p-butylaniline with p-propoxybenzaldehyde in alcohol. The product is recrystallized from alcohol.

Example 7

N-(p-ethoxybenzylidene)-p-pentylaniline is prepared by treating p-pentylaniline with p-ethoxybenzaldehyde in alcohol. The product is recrystallized from alcohol.

Nematic liquid crystal mixtures are prepared by mixing weighed amounts of various combinations of the products of the foregoing examples. The mixtures are heated gently until a clear isotropic melt is obtained. The isotropic melt is agitated to insure complete and homogeneous mixing. The resulting melt is filtered to remove trace insoluble materials and then stirred over Linde 4A Molecular sieves to remove traces of moisture.

The isotropic-nematic transition temperature is read on cooling of the melt when the cloudy nematic mesophase is persistent. The reverse, nematic-isotropic transition temperature is read while gently warming when a clear isotropic melt is persistent. These temperatures are identical. The crystal-nematic transition temperature is read after storing the mixture below 0° C. for several hours, and in some cases longer, then allowing the mixture to warm to room temperature.

The composition and mesomorphic range of mixtures according to this invention and including components of the foregoing examples are shown in Table I. The ratios of the components are 1 part per 1 part unless otherwise indicated. The components are identified by example number.

TABLE I

| Mixture number: | Components | Nematic range, ° C. |
|---|---|---|
| 1 | I:III:IV | 0–75 |
| 2 | I:IV:V | 0–63 |
| 3 | I:II:1.5V | −10–72 |
| 4 | I:IV:VI | 0–67 |
| 5 | I:II:VI | 10–75 |
| 6 | I:II:III | −10–81 |
| 7 | I:III:VI | −5–74 |
| 8 | I:IV:VII | −10–71 |
| 9 | I:IV:VII:.5V | −10–76 |
| 10 | I:II:VII:.5V | −10–77 |
| 11 | I:III:VII:.5V | −10–76 |
| 12 | I:VI:VII:.5V | −10–71 |

It can be seen from the foregoing that liquid crystal compositions of extremely wide mesomorphic range can be obtained by mixtures of the various compounds set forth above.

The invention has been described in detail with particular reference to preferred embodiments thereof, but it will be understood that variations and modifications can be effected within the spirit and scope of the invention.

What is claimed is:

1. A nematic liquid crystal composition comprising a mixture of at least two compounds of the formula:

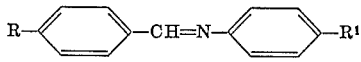

wherein each R and R¹ are radicals selected from the group consisting of a saturated alkoxy radical and an alkyl radical, each radical having from 1 to 9 carbon atoms, when R is an alkoxy radical, R¹ is an alkyl radical, and vice versa, with at least one compound of the formula:

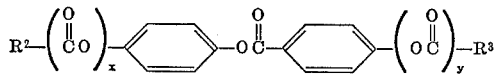

wherein R² and R³ are saturated alkoxy radicals of from 1 to 9 carbon atoms and $x$ and $y$ differ and are selected from the group consisting of 0 and 1.

2. A nematic liquid crystal composition according to claim 1 wherein two compounds of the formula:

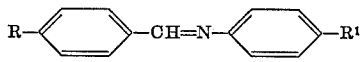

are present, each R is an alkoxy radical and each R¹ is an alkyl radical.

3. A nematic liquid crystal composition according to claim 2 wherein said two compounds are N(p-methoxybenzylidene) - p - propylaniline and N(p - ethoxybenzylidene)-p-butylaniline.

4. A nematic liquid crystal composition according to claim 2 wherein said two compounds are N-(p-methoxybenzylidene)-p-propylaniline and N-(p-methoxybenzylidene)-p-butylaniline.

5. A nematic liquid crystal composition according to claim 2 wherein said two compounds are N-(p-butoxybenzylidene)-p-propylaniline and N-(p-methoxybenzylidene)-p-butylaniline.

6. A nematic liquid crystal composition according to claim 1 wherein said last indicated compound is butyl-p-(p-ethoxyphenoxycarbonyl)phenyl carbonate.

7. A nematic liquid crystal composition according to claim 6 wherein said two compounds are N-(p-methoxybenzylidene)-p-propylaniline and N-(p-propoxybenzylidene)-p-butylaniline.

8. A nematic liquid crystal composition having a very broad mesophase comprising a mixture of (a) at least two compounds of the formula:

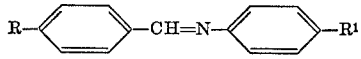

wherein each R is a saturated alkoxy radical having from 1 to 5 carbon atoms and each R¹ is an alkyl radical having from 2 to 6 carbon atoms; and (b) at least one compound of the formula:

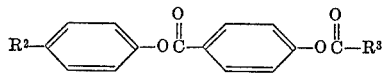

wherein R² and R³ are saturated alkoxy radicals having from 1 to 5 carbon atoms.

9. A nematic liquid crystal composition according to claim 8 wherein said one compound is butyl-p(p-ethoxyphenoxycarbonyl)phenyl carbonate.

10. A nematic liquid crystal composition according to claim 9 wherein said two compounds are N-(p-butoxybenzylidene) - p - propylaniline and N-(p-propoxybenzylidene)-p-butylaniline.

11. A nematic liquid crystal composition according to claim 9 wherein said two compounds are N-(p-butoxybenzylidene) - p - propylaniline and N-(p-ethoxybenzylidene)-p-butylaniline.

12. A nematic liquid crystal composition according to claim 9 wherein said two compounds are N-(p-ethoxybenzylidene) - p - butylaniline and N-(p-propoxybenzylidene)-p-butylaniline.

13. A nematic liquid crystal composition according to claim 9 wherein said two compounds are N-(p-methoxybenzylidene) - p - propylaniline and N-(p-ethoxybenzylidene)-p-pentylaniline.

14. A nematic liquid crystal composition according to claim 9 wherein said portion (a) comprises N-(p-methoxybenzylidene)-p-propylaniline; N-(p-ethoxybenzylidene)-p-pentylaniline and N-(p-methoxybenzylidene) - p - butylaniline.

15. A nematic liquid crystal composition according to claim 9 wherein said portion (a) comprises N-(p-ethoxybenzylidene)-p-propylaniline; N-(p-ethoxybenzylidene)-p-pentylaniline, and N-(p-methoxybenzylidene) - p - butylaniline.

16. A nematic liquid crystal composition according to claim 9 wherein said portion (a) comprises N-p-ethoxybenzylidene)-p-butylaniline; N-(p-ethoxybenzylidene)-p-pentylaniline, and N-(p-methoxybenzylidene) - p - butylaniline.

17. A nematic liquid crystal composition according to claim 9 wherein said portion (a) comprises N-(p-propoxybenzylidene)-p-butylaniline; N-(p-ethoxybenzylidene)-p-pentylaniline; and N-(p-methoxybenzylidene) - p - butylaniline.

References Cited
UNITED STATES PATENTS 3,689,525  9/1972  Scheurle et al. ____ 260—473 R
3,690,745  9/1972  Jones _____ 350—160 R GEORGE F. LESMES, Primary Examiner M. B. WITTENBERG, Assistant Examiner U.S. Cl. X.R.

23—230 LC; 260—463, 566